No. 744,700. PATENTED NOV. 17, 1903.
A. T. WILSON.
CHARCOAL OR COKE OVEN.
APPLICATION FILED AUG. 22, 1903.
NO MODEL. 3 SHEETS—SHEET 2.

Witnesses:
R. L. Leibrock.
A. G. Hague.

Inventor: Alonzo T. Wilson,
By Thomas G. Orwig, Attorney.

No. 744,700. PATENTED NOV. 17, 1903.
A. T. WILSON.
CHARCOAL OR COKE OVEN.
APPLICATION FILED AUG. 22, 1903.
NO MODEL. 3 SHEETS—SHEET 3.

Witnesses: Inventor: Alonzo T. Wilson,
By Thomas C. Orwig, Attorney

No. 744,700.

Patented November 17, 1903.

UNITED STATES PATENT OFFICE.

ALONZO T. WILSON, OF DES MOINES, IOWA.

CHARCOAL OR COKE OVEN.

SPECIFICATION forming part of Letters Patent No. 744,700, dated November 17, 1903.

Application filed August 22, 1903. Serial No. 170,412. (No model.)

*To all whom it may concern:*

Be it known that I, ALONZO T. WILSON, a citizen of the United States, residing at Des Moines, in the county of Polk and State of Iowa, have invented a new and useful Charcoal or Coke Oven, of which the following is a specification.

Heretofore charcoal and coke ovens have expelled carbonaceous volatile matter liberated from the wood and coal subjected to heat generated in the ovens.

My object is to burn and utilize such volatile matter for generating heat and thereby reducing the minimum of fuel required and lessening the cost of providing charcoal and coke.

My invention consists in the construction and operation of an oven as hereinafter set forth, pointed out in my claims, and illustrated in the accompanying drawings, in which—

Figure 1:
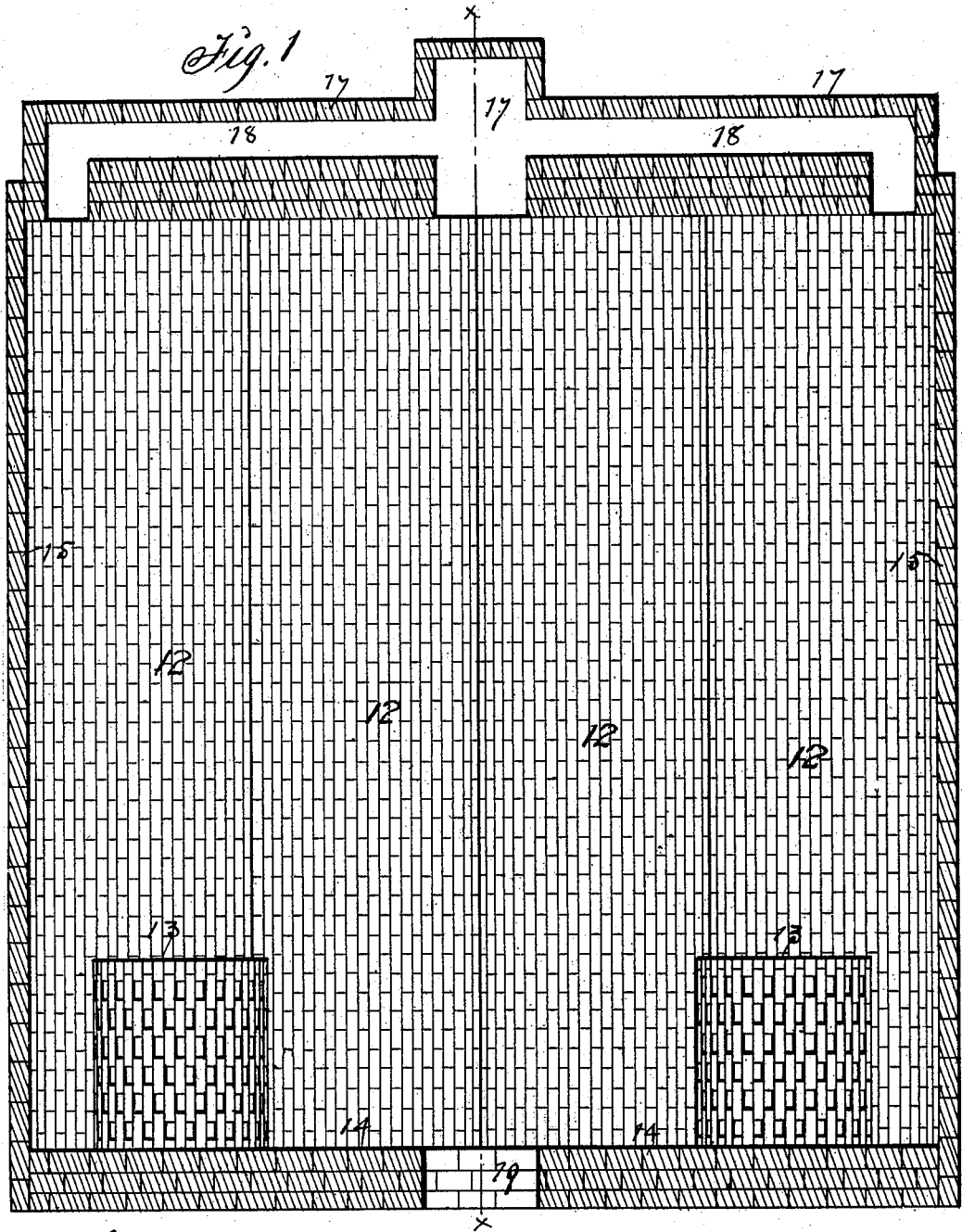
Figure 2:
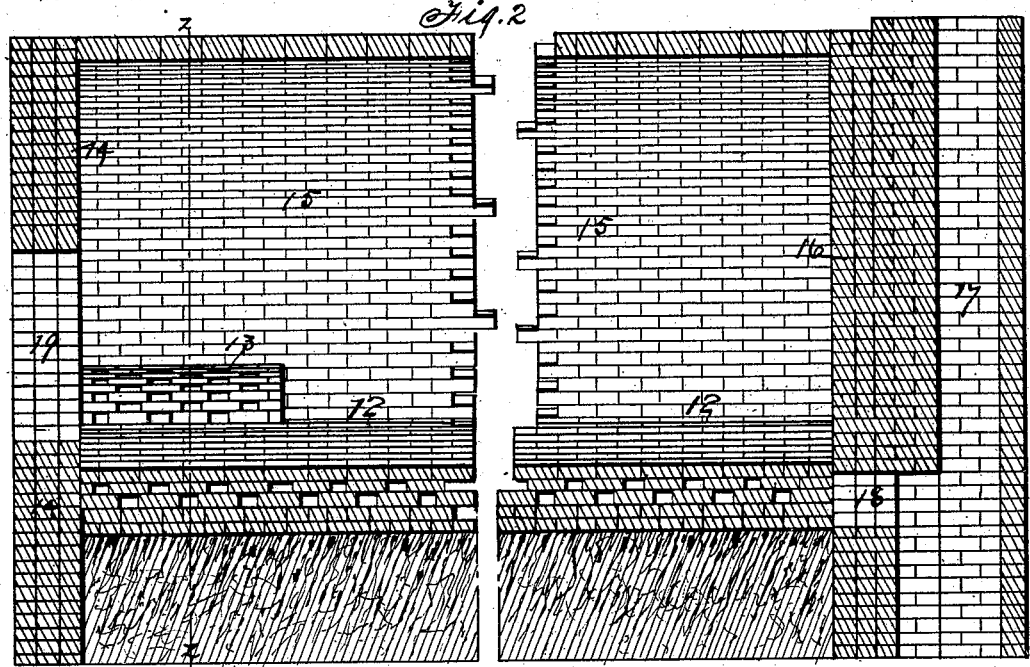
Figure 3:
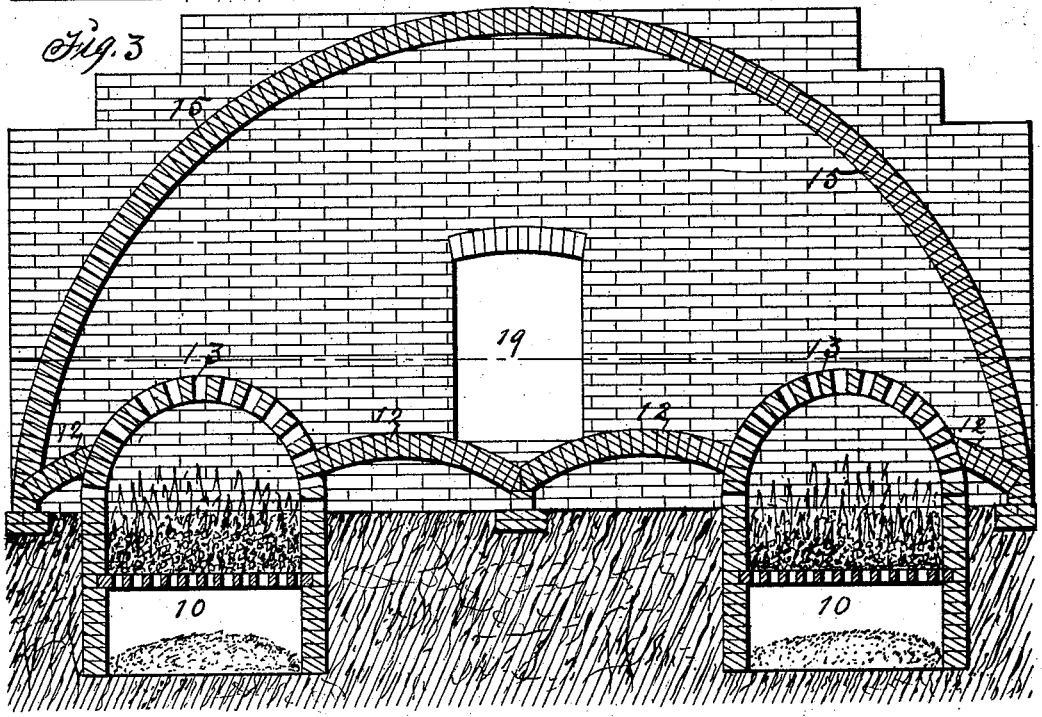
Figure 4:
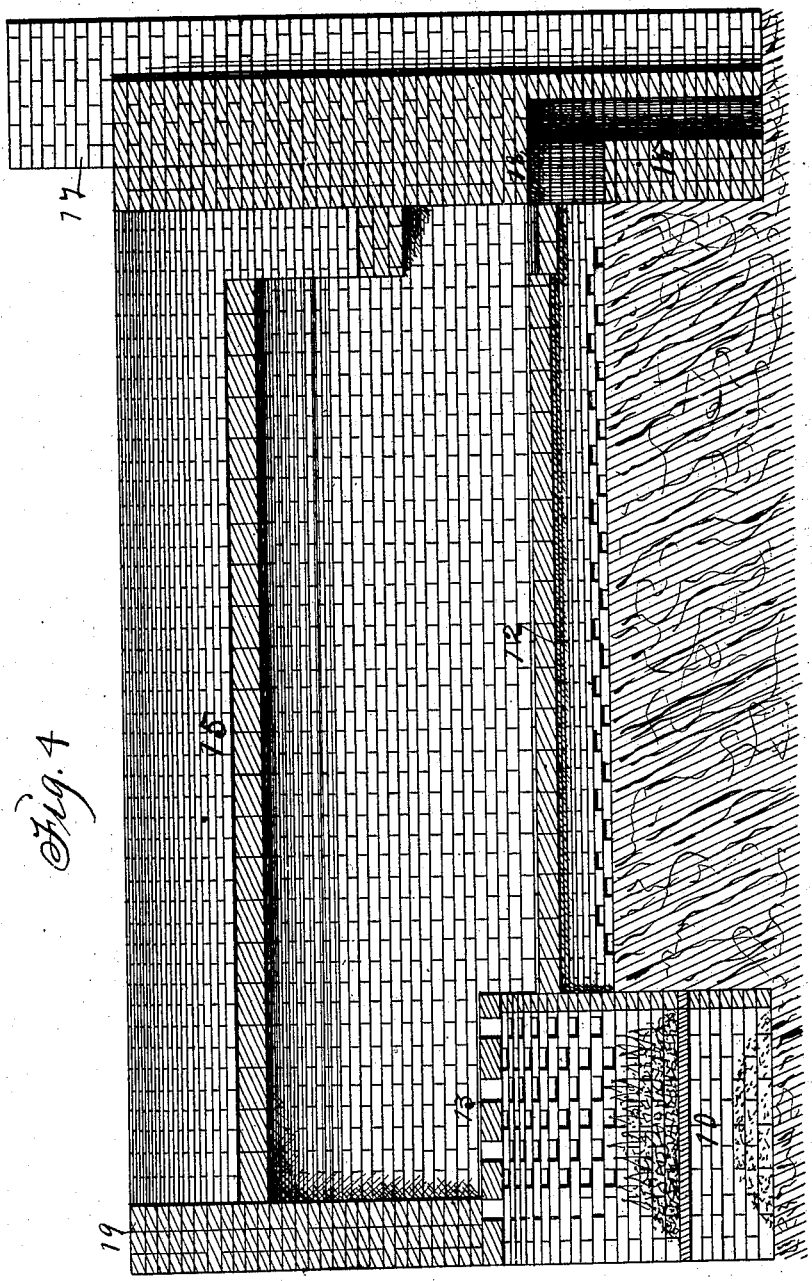

Figure 1 is a horizontal sectional view of the structure that shows a plurality of arches in the floor, arched combustion-chambers, and a doorway at one end and horizontal flues and a chimney at the other end. Fig. 2 is a longitudinal sectional view in two parts on the line *x x* of Fig. 1 and shows apertures under the arched floor that allow communication between the combustion-chambers and the transverse flues under the floor and rear end of the oven and the chimney. Fig. 3 is a transverse sectional view on the line *z z* of Fig. 2 and shows the position of the furnaces relative to the arched floor and the openings that establish communication between the combustion-chamber and the space above and below the arched floor. Fig. 4 is a vertical longitudinal sectional view through the middle of one of the furnaces and shows the passages that communicate with the horizontal flue.

The numerals 10 designate furnaces adapted for burning wood or coal located under the arched floor 12 of the oven, and 13 represents arched tops over the furnaces that produce combustion-chambers that extend through and above the arched floor and rearward a short distance relative to the front wall 14 of the oven. The side walls are practically an arched roof 15, that is compact and closed from top to bottom and from front to rear.

The rear wall 16 has an integral chimney 17 and below the arched floor horizontal flues 18, through which the waste products of combustion pass from under the floor to the chimney and escape therethrough.

A doorway 19 in the center of the front wall 14 allows ingress and egress to the oven as required for filling in wood and coal and removing charcoal and coke at different times.

In the practical use of my invention when the oven is filled with wood or coal and the doorway sealed and fires started in the furnaces and the fronts of the furnaces closed in any suitable way, so as not to let too much air to the fuel, the fuel burned on the grates will generate heat sufficient to rise from the combustion-chambers and penetrate the combustible material in the oven and expel therefrom the gaseous matter, or all that can be volatilized, and produce a pressure that will force the volatilized matter or gases down into the combustion-chambers, where it will be burned and utilized in connection with the fuel on the furnace-grates for maintaining the requisite heat in the oven until the wood in the oven has been converted into charcoal or coal in the oven into coke. After the combustible volatile matter is burned in the combustion-chambers the smoke and waste products of combustion will pass through the apertures in the walls of the combustion-chambers under the floor into the vacant space under the floor and then rearward into the horizontal flues in the rear wall of the oven and then up and out through the chimney.

Having thus described the purpose of my invention and its construction and operation, the practical utility thereof will be obvious to persons familiar with the art to which it pertains, and what I claim as new, and desire to secure by Letters Patent, is—

1. In an oven for making charcoal and coke, a closed floor, a closed wall above the floor, a furnace under the floor, a combustion-chamber extending through the floor and apertured for the passage of the products of combustion and the furnace apertured under the floor for communicating with an open space extending under the floor in the manner set forth for the purposes stated.

2. In an oven for making charcoal and coke, a closed floor, a closed wall above the floor, a furnace under the floor, a combustion-chamber extending through the floor and apertured for the passage of the products of combustion and the furnace apertured under the floor for communicating with an open space extending under the floor, a horizontal flue in the rear wall under the floor and a chimney in communication with said flues, arranged and combined in the manner set forth for the purposes stated.

3. An oven for making charcoal and coke comprising a front wall having a doorway, a rear wall having horizontal flues, a chimney connected with said flues, an arched wall and roof closed from top to bottom and from front to rear, a closed floor, furnaces in the front wall under the floor and communicating with an open space under the floor and combustion-chamber extending rearward from the front wall and upward from the furnaces and provided with apertures communicating with the chamber above the floor, arranged and combined to operate in the manner set forth for the purposes stated.

ALONZO T. WILSON.

Witnesses:
R. H. ORWIG,
THOMAS G. ORWIG.